United States Patent [19]

DiNovo et al.

[11] 4,303,469
[45] Dec. 1, 1981

[54] PROCESS AND APPARATUS FOR RECOVERY OF SPENT PULPING LIQUORS

[75] Inventors: Salvatore T. DiNovo; Wayne E. Ballantyne, both of Columbus, Ohio

[73] Assignee: International Paper Company, New York, N.Y.

[21] Appl. No.: 139,657

[22] Filed: Apr. 14, 1980

[51] Int. Cl.³ .............................................. D21C 11/12
[52] U.S. Cl. .................... 162/30 R; 162/36; 162/47; 162/30 K; 422/142; 422/144; 422/147; 422/185; 423/DIG. 3
[58] Field of Search ...................... 162/30 R, 30 K, 36, 162/47; 423/207, DIG. 3; 422/185, 142, 144, 147; 110/347, 245

[56] References Cited

U.S. PATENT DOCUMENTS

| | | | |
|---|---|---|---|
| 2,291,833 | 8/1942 | Savell | 162/30 K |
| 3,322,492 | 5/1967 | Flood | 162/30 K |
| 3,574,051 | 4/1971 | Shah | 162/30 K |
| 3,674,630 | 7/1972 | Copeland | 162/30 K |
| 3,761,568 | 9/1973 | Brink et al. | 423/207 |
| 4,084,545 | 4/1978 | Nack et al. | 110/245 |

Primary Examiner—William F. Smith
Attorney, Agent, or Firm—Ronald A. Schapira

[57] ABSTRACT

An integrated system, process and apparatus are provided for the efficient and effective recovery of spent pulping liquors, particularly kraft black liquor, whereby in an initial stage concentrated spent liquor is subjected to combustion in a reactor equipped with a plurality of particulate materials, at least one of which is of finer particle size than the other, preferably subjecting a portion of said particulate materials to at least one further treatment in a fluidized bed unit, and treating the inorganic solid combustion products in a reducing atmosphere.

42 Claims, 1 Drawing Figure

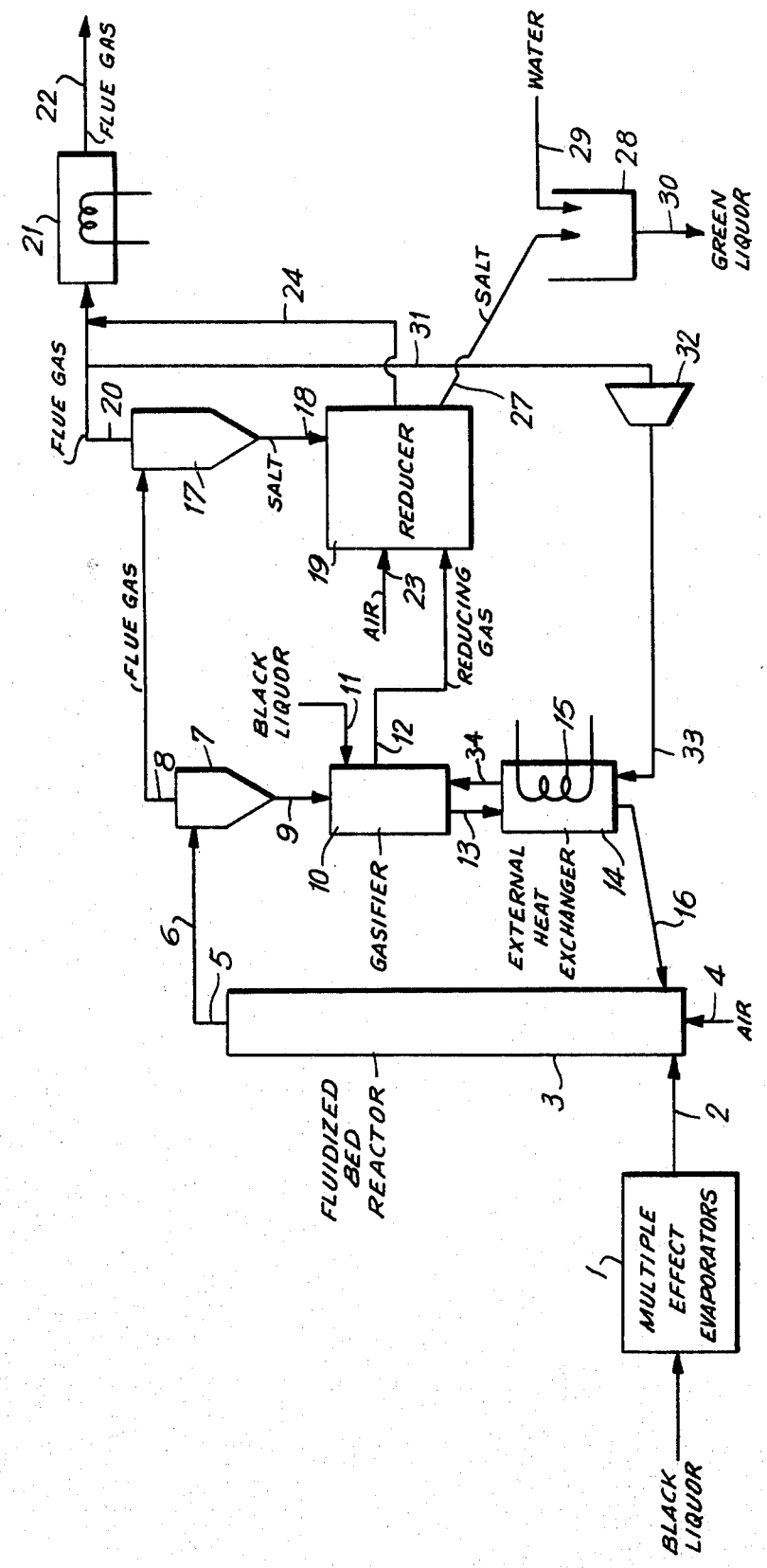

PROCESS AND APPARATUS FOR RECOVERY OF SPENT PULPING LIQUORS

BACKGROUND OF THE INVENTION

The present invention is directed to an integrated system, process and apparatus for the recovery of chemical values from spent pulping liquors emanating from the paper industry.

In processes involving chemical pulping of lignocellulosic materials, such as wood chips, the common processes are usually referred to as the kraft process and the sulfite process. There are some processes which employ chemicals along with mechanical steps, and these processes are sometimes referred to as semi-chemical or chemi-mechanical pulping processes. These processes use some o the same chemicals as the kraft and sulfite processes. Another process is the so-called soda process.

The preferred chemical pulping process is the so-called kraft process. The kraft process involves cooking or pulping the wood chips in an alkaline aqueous solution of sodium hydroxide, sodium carbonate, and sodium sulfide. This is usually carried out in a pressure vessel called a digester in which the contents are heated to temperatures of about 160° to 180° C., for about 1 to 3 hours. At the end of the cooking or pulping stage, the kraft cooking liquor is washed from the pulp and is subjected to a recovery treatment to recover the chemical and energy values. This material is known as kraft black liquor because of its dark color.

In the so-called sulfite process, the wood chips are pulped or cooked in an acidic aqueous solution of sulfur dioxide, along with chemicals providing calcium, magnesium, sodium, or ammonium ions. Essentially, the aqueous solution is made up of sulfurous acid and sulfite and bisulfite ions. In this process, the cooking period lasts from about 6 to 8 hours during which the temperature rises to about 140° C. In a variation of the sulfite pulping process, the cooking liquor, instead of being an acidic solution, is neutralized or made mildly alkaline. The spent liquor from the conventional sulfite pulping processes have been recovered in several ways. In general, it has been more difficult to recover the chemical values from the spent liquors of the sulfite process than from the black liquors of the kraft process. This is partially responsible for the predominant use of the kraft process over the sulfite process in the pulping of lignocellulosic material.

Heretofore, the traditional process for the recovery of kraft black liquor has been the use of the so-called Tomlinson kraft recovery boiler. In the Tomlinson recovery boiler, concentrated black liquor serves as fuel to provide heat for general process use. The combusted liquor produces, in addition to the heat values from combustion of the organic matter present, a smelt, or molten body of inorganic chemicals. The smelt is dissolved in water to produce so-called green liquor. This is an aqueous solution of sodium carbonate and sodium sulfite. This green liquor, after treatment with lime (calcium hydroxide) to convert some of the sodium carbonate to sodium hydroxide, becomes white liquor (after removal of by-product calcium carbonate by filtration). The white liquor is a cooking or pulping liquor which can be used in future kraft pulping operations after replacement of any depleted components.

The use of the Tomlinson recovery furnace presents a number of problems. At the outset, its use presents an opportunity for serious explosions if water inadvertantly contacts molten inorganic salts. Another disadvantage is that the recovery of energy values from the spent kraft black liquor is substantially less than desirable. A further disadvantage is that the Tomlinson process does not permit independent control of the physical and chemical actions which are present within the process. Also, the process tends to cause pollution of the atmosphere by reduced sulfur compounds.

It is, therefore, not surprising that the paper industry has sought other more satisfactory means of waste pulping liquor recovery. One such effort has been that described in Flood U.S. Pat. No. 3,322,492. In that process a sequence of at least two fluidized bed operations was employed. In the first fluidized bed chamber, black liquor is dried to solid granules by heated air. In the second fluidized bed chamber, the dried solid granules produced in the first chamber are subjected to further heating under conditions which cause decomposition of the organic constituents and some reduction of the sodium sulfate content by virtue of the carbon monoxide derived from the decomposition of the organic matter. This forms sodium sulfide and carbon dioxide. Off gases from this process include hydrogen sulfide, along with carbon dioxide, carbon monoxide, hydrogen, and nitrogen.

In the process of Shal U.S. Pat. No. 3,574,051, kraft black liquor is concentrated by contact with a stream of heated air under conditions which do not cause decomposition of the black liquor constituents. The resulting concentrated black liquor is then burned with air in a fluidized bed reactor, in an excess of air, so as to produce total oxidation of the black liquor components, both organic and inorganic. Under these conditions, all sulfur compounds are converted primarily to sodium sulfate. The resulting inorganic solid salts are discharged from the fluidized bed reactor in which the main constituents are sodium sulfate and sodium carbonate. These solid salts are then passed through to a chemical reactor and subjected to a reducing gas stream which is made up of carbon monoxide as the reducing component. This causes the sodium sulfate in the solid salts to be reduced to sodium sulfide, and sodium sulfide along with sodium carbonate are dissolved in water to form green liquor which can then be processed in the usual manner to provide white liquor.

Osterman et al. U.S. Pat. No. 3,523,864 describes a process for the recovery of kraft black liquor involving the treatment of dried black liquor in a three-zone fluidized bed reactor in which black liquor is dried and oxidized in the intermediate zone, the inorganic sodium and sulfur compounds are reduced in the bottom zone, and the calcium carbonate is calcined to form calcium oxide in the top of the three zones.

Priestley U.S. Pat. No. 3,578,396 describes a process for reclaiming chemicals from spent sulfite pulping liquors by reacting the spent liquor in a thermal oxidizing fluidized bed reactor to produce, at a temperature of 1200° to 1400° F., a granular material, while still in a fluidized bed reactor, which is cooled somewhat and subjected to treatment with sulfur dioxide at a temperature of approximately 1000° to 1200° F. This is said to convert some of the carbonate to sodium acid sulfate.

Shick U.S. Pat. No. 3,676,064 is another patent describing a process for the recovery of chemical values from spent sulfite pulping liquors. In that process, the spent sulfite liquor is treated in a fluidized bed reactor to convert the inorganic solids to essentially sodium sulfate and sodium carbonate, and the inorganic material is pyrolysed. Sulfur dioxide gas is absorbed into a soluton of sodium carbonate produced in the fluidized bed reactor.

Copeland U.S. Pat. No. 3,864,192 describes a process for the recovery of sulfite spent pulping liquors whereby the spent liquor is combined with magnesia, the mixture concentrated by evaporation at an elevated temperature, and the concentrated spent liquor is fed to a fluidized bed reactor and combusted therein.

Copeland U.S. Pat. No. 3,862,909 describes a process for recovering chemical values from kraft or sulfite spent pulping liquors by controlled autogeneous combustion or pyrolysis of the concentrated liquors in a fluidized bed reactor in which the carbonaceous material is converted to activated carbon. The inorganic salts are leached with water and thereafter recovered.

Copeland et al. U.S. Pat. No. 3,309,262 describes a process for the recovery of spent pulping liquors, including kraft black liquor. The spent liquor is concentrated and introduced by atomization into a fluidized bed reactor. The resulting waste liquor spray encounters residual inorganic chemicals derived from the combustion of previous spent liquors. Such chemicals are, for example, sodium sulfate, sodium carbonate, sodium hydroxide, and mixtures thereof. Additionally, the fluidized bed reactor may contain other and different, inert materials, such as silica grains in admixture with the inorganic chemicals. In the fluidized bed reactor, the organic material is combusted. The resulting dry granular inorganic material produced is to some extent recycled or retained in the fluidized bed reactor for further operations and some of the inorganic material is then subjected to recovery.

The use of conventional fluidized bed combustors, as in the case of the foregoing patent, has been plagued by the inability to remove heat of combustion at temperatures in the order of 1300° F., which temperatures occur in a normal combustion operation. This is due to poor mixing, corrosion of the equipment, and fouling of the cooling tubes.

As far as is known, none of these foregoing processes has ever achieved utilization on a commercial scale.

It is, therefor, an object of the present invention to provide a system, process and apparatus for the efficient recovery of energy and chemical values in spent pulping liquors.

It is a further object of the present invention to provide a system, process and apparatus for the recovery of chemical values from spent pulping liquors from various pulping processes which are free from the disadvantages of the prior art recovery means.

It is a further object of the present invention to provide a system, process and apparatus for separation and individual control over each of the three prime functions of a kraft recovery system, viz., combustion, steam generation and sulfate reduction.

Other objects of the present invention will be apparent to those skilled in the art from the present description, taken in conjunction with the appended drawing which is a flow sheet or flow diagram describing the system, process and apparatus of the present invention.

GENERAL DESCRIPTION OF THE INVENTION

The system, process and apparatus of the present invention for the recovery of chemical and energy values from spent pulping liquors of various types provides an integrated means of high thermal efficiency in which more than 50 percent of the heat values of the spent pulping liquor are recovered, i.e., substantially greater than for the Tomlinson process. The apparatus of the invention requires relatively low capital investment because of its highly efficient nature. The present invention is a completely integrated operation starting with the spent pulping liquor, such as kraft black liquor, spent sulfite pulping liquor, or spent soda process pulping liquor, incident to the paper industry, and recovering in a highly efficient fashion the heat energy which is available from the combustion of the organic material of the spent liquor and resulting, at the conclusion, in the recovery of reuseable pulping liquor, such as the so-called "white" liquor employed in the kraft process.

In its basic elements, the process of the invention involves combustion concentrated spent pulping liquor in a fluidized bed reactor, employing multiple inert solid particle components, one of which may be referred to as being of fine, lighter particles and the other of coarse, heavier particles. In the process, the spent liquor is introduced at the bottom of an initial fluidized bed reactor which also contains the plurality of inert solid particle components and is subjected to the introduction of sufficient air to support a substantial combustion of most, but not all, of the organic matter contained in the concentrated spent pulping liquor. Desirably, only about 80 to 90%, based on carbon content of the organic material is combusted in the initial fluidized bed. The plurality of inert particulate solid components, as well as the combustion gases and uncombusted material from the initial fluidized bed reactor, are removed from the top of the fluidized bed reactor and subjected to a separation of most of the inert solids from the mixture of gases and combusted spent liquor solids.

Thereafter, the separated inert solids are optionally fed to a unit which may be referred to as a "gasifier" which is another fluidized bed reactor in which the inert solids present are only the finer inert particulate solids from the initial fluidized bed reactor. Introduced in the gasifier unit is more spent liquor having an organic matter content, such as additional concentrated kraft black liquor. Under the thermal conditions present and lack of oxygen, the organic matter is decomposed to produce reducing gases for use later in the process.

Optionally, the gasifier may be eliminated from the process when providing for incomplete combustion in the initial fluidized bed reactor, as described above, so to provide for the formation of uncombusted carbonaceous material which serves the purpose of providing reduction, at a later stage in the process, of the sulfate formed by the combustion of the spent liquor, to sulfide compounds.

The separated inert solids which may optionally pass through the gasifier are then transmitted to one or more fluidized beds acting as external boilers. This unit may preferably contain immersed tubes and high pressure steam can be generated from the sensible heat released by the solids. This external boiler removes most of the residual heat value produced in combustion in the initial fluidized bed reactor and contained in the finer inert solids. These finer inert solids, with much of their heat value recovered, are returned to the initial fluidized bed reactor where they are contacted with air and concentrated spent liquor and refluidized.

The employment of the plural-stage fluidized bed reactors, the initial stage of which employs two sources of solid particulate components, performs the role of absorbing heat of combustion and, as distinguished from conventional fluidized bed reactors, the solids, as well as the gaseous components, are removed at the top of the reactor, instead of the bottom. In this way, combustion is carried out efficiently at high gas velocity without the need of internal heat removal surfaces in the initial fluidized bed reactor. Conventional fluidized bed reactors remove heat via tubes imbedded in the reactor and, depending on the operating conditions, may hinder the fluidization process. The plurality of solid particulate components employed in the initial fluidized bed reactor are inert and perform the roles primarily of absorbing heat from the combustion of the spent pulping liquor and providing excellent mixing of air and concentrated black liquor.

A suitable multiple solid fluidized bed reactor for use in the present invention is disclosed in Nack et al. U.S. Pat. No. 4,084,545. As disclosed in that patent, the initial fluidized bed reactor or combustor employs two solid particle components, at least one of the components essentially comprising a material having long-term physical and chemical stability in the combustor system. One such suitable specific material to be used to form one or both components is a hematite ore, containing about 93 percent of an oxide of iron, $FE_2O_3$, and supplied under the trademark "Speculite" by C. E. Minerals, Inc. of King of Prussia, Pennsylvania. The first component may consist of "fine" particles of this ore in the range of $-16+140$ U.S. mesh; that is, the particles will pass through a 16 mesh screen but not through a 140 mesh screen. A suitable alternate first component particle may comprise limestone particles in the range of about $-20+40$ U.S. mesh. In both cases, a suitable second component to be employed is "coarse" Speculite particles in the range of about $-12+16$ U.S. mesh. Another excellent alternative for the coarse or second component is ordinary sand. The bed system containing these fine and coarse particles is fluidized with gas at a superficial velocity of about 30 feet per second.

At this velocity, the fine hematite or limestone particles are carried along with the current of air, forming an entrained fluidized bed which is highly expanded to fill substantially the entire space region encompassed by the initial fluidized bed reactor chamber and its exit conduit. The coarse hematite or sand particles are too massive to be entrained, but form a dense fluidized bed which is retained in a more limited space region near the bottom of the initial fluidized bed reactor chamber. The fine particles are carried out of the unit and into a separator, such as a cyclone separator, whereby the fine inert bed particles are removed from the entraining gas stream and fed into a recirculation path. The recirculation path carries the fine inert particles back, eventually to the dense fluidized bed of the initial fluidized bed reactor. Hence, there is a continuous, recirculating flow of entrained fine particles through the agitated, fluidized mass of coarse particles.

Concentrated spent pulping liquor which has been concentrated to a solids content of at least about 50 percent, such as about 50 to 100 percent, preferably 60 to 85 percent, by weight of solids, by any suitable means, such as a multiple-effect evaporator, is fed into the dense fluidized bed of the initial fluidized bed reactor containing the commingled coarse and fine particles and burned by means of air introduced at the bottom of the reactor to produce heat. Desirably, the combustion is maintained at a temperature of about 1300° F.

The numerous advantages of a multiple solid fluidized bed combuster operated in accordance with the present invention can be explained by an examination of its characteristics. The recirculating fine bed component particles which interpenetrate the dense fluidized bed appear to provide highly uniform fluidization and minimize "slugging." The agitated motion of the commingled particles results in thorough mixing and intimate contact between the gaseous and solid reactants introduced into the dense fluidized bed. Even though the superficial velocity is unprecedentedly high, the commingled bed particles substantially retard the movement of the solids in the principal direction of air flow. Hence, the solid particles are retained in the dense fluidized bed for a sufficient length of time to allow the major portion of the organic components of the spent pulping liquor to be substantially burned before they are carried out of the dense bed region.

The increased residence time of the solids produced by combustion and the finer component particles in the dense fluidized bed portion of the combustor, operated in accordance with the process of this invention at high superficial velocities, probably occurs because the coarse bed component particles limit the mean free path of the fine bed component particles, and both of these bed component particles limit the mean free path of the inorganic solids produced by combustion and the fine particles in the dense bed region.

The high throughput per unit volume, and high heat release rate of a fluidized bed boiler operated according to the present invention are achieved in part by the high heat transfer rate from the gas phase to the inert solids throughout the entire volume of the combustion chamber of the initial fluidized bed combustor, including what is normally the freeboard region above the dense fluidized bed.

The initial fluidized bed reactor operated according to the invention nevertheless can provide high turn-down ratios, and is therefore controllable to suit widely varying load requirements.

Thus, in essence, an essential and primary aspect of the initial fluidized bed reactor in the present invention involves forming an entrained fluidized bed in a first space region containing a first solid bed particle component, forming in a more limited space region within the first region a dense fluidized bed containing a second solid bed particulate component comprising a material having a long-term physical and chemical stability in the fluidized bed system so that the components are substantially non-agglomerating and not subject to substantial attrition therein, providing a recirculation path for the first particulate component from the first space region through the dense fluidized bed in the more limited space region, and operating the fluidized bed system at a velocity such that the second component particulate matter is effectively retained in the dense fluidized bed of the more limited space region, whereas the first component particles recirculate and penetrate therethrough, commingling with the second component particles.

Thus, the invention is particularly useful for promoting a high-efficiency combustion of the organic components of spent pulping liquor to obtain their energy values. Air and concentrated spent pulping liquors are introduced into the initial fluidized bed reactor in such manner as to provide thorough mixing of the reactants as a result of the motion of the commingled particles in the dense fluidized bed. The concentrated spent liquor is fed into the system at the predetermined rate, fluidizing the bed system at a superficial velocity such that the air is supplied thereto at a rate sufficient to effect the desired degree of less than complete combustion of the organic matter of the spent liquor being fed, and selecting the bed particle components so that the first component particles will be entrained at the superficial velocity while the second component particles will be effectively retained in the dense fluidized bed in the more limited space region near the bottom of the reactor.

Typically, the method comprises withdrawing heat energy at a rate sufficient to maintain the temperature of the fluidized bed system essentially below the melting point of the inorganic solids formed from the combustion of the spent liquor whereby essentially all of these solids are entrained with the first, or finer, solid bed component particles, and separating the inorganic solids from the first solid bed component particles in the recirculation path outside the more limited space region.

Typically, the first and second solid bed particle components may consist essentially of the same material, the first component essentially comprising finer particles and the second component essentially comprising coarser particles.

Typically, at least the second bed particle component has high temperature stability, is substantially inert under the operating conditions of the fluidized bed system, and is selected to provide good fluidization quality and promote efficient mixing and heat transfer in the bed system. Where oxidizing conditions exist in the fluidized bed system, typically the bed particle components essentially comprise metals or metallic oxides such as an oxide of iron, typically, as it is contained in hematite. The components alternately may essentially comprise aluminum oxide or nickel or nickel oxide. The finer iron oxide particles may be in the size range of about $-16 +140$ U.S. mesh, and the coarser particles may be in the size range of about $-12 +16$ U.S. mesh. Typically, the dense fluidized bed is retained in a container having a substantially cylindrical or prismatic portion, and the quantity of the coarser particles is sufficient to fill the cylindrical or prismatic portion to a depth of at least about 10 inches when the bed is unfluidized. The superficial velocity of the gas in the fluidized bed may be in the range of about 20–40 feet per second. In another typical arrangement, the first solid bed particle component essentially comprises a carbonate of calcium, magnesium, or both, as is contained in limestone or dolomite. In this case, the second bed particle component may essentially comprise a metal or a metallic oxide such as an oxide of iron which is contained in hematite.

Alternatively, the second bed particle component essentially comprises ordinary sand, aluminum oxide, or nickel or nickel oxide.

The second bed component particles may comprise sand or hematite, in the particle size range of about $-12 +16$ U.S. mesh, the first component particles may comprise hematite or Speculite in the particle size range of about $-20 +140$ U.S. mesh, and the superficial velocity of the fluidized bed system may be in the range of about 20–40 feet per second.

The air is supplied to the dense fluidized bed with a velocity sufficient to fluidize the second component particles therein and to maintain the circulation of the first component particles therethrough while supplying sufficient air to the entrained bed so that the entrained bed is operated in an oxygen mode sufficient to provide about 80 to 90 percent of complete combustion of the organic matter in the spent liquor.

After the combustion products are removed from the initial multiple solids fluidized bed reactor, gaseous and solid products are removed from the top of the reactor. At this stage, the materials removed are essentially solid inorganic sulfate and carbonate in the case of kraft black liquor recovery and finer particle inert solid (such as Speculite), and the gases are carbon dioxide, nitrogen and moisture. There will also be some uncombusted organic material. These materials are then passed through a solids separator, such as a cyclone. This separates most of the inert solids from the mixture of gases and oxidized spent liquor solids.

The separated inert solids may then optionally be passed into the gasifier described above, along with some additional amount of concentrated spent pulping liquor. This gasifier is essentially a second fluidized bed reactor in which the additional spent liquor, such as kraft black liquor, generates a reducing gas suitable for subsequent reduction of inorganic salts.

The gasifier may be dispensed with, if desired, since its role in the process can be performed by the uncombusted organic matter emanating from the initial fluidized bed reactor. As described above, about 10 to 20 percent, based on carbon content of the organic matter in the spent liquor, is not combusted in the initial fluidized bed reactor. As a consequence, this solid uncombusted carbonaceous material is separated and carried to the reducer unit in the system of the invention where it performs a dual role. First, it acts as a reducing agent to reduce any sulfate formed from the combustion of the waste liquor to sulfides. Sulfides form an important component in pulping liquors utilized in the kraft process. Second, some uncombusted carbonaceous material is combusted with air in the reducer unit to provide needed heat energy to support the substantially endothermic reaction of reducing sulfate to sulfide.

After passing from the gasifier unit, the inert solids are subjected to an external boiler or heat exchanger to permit cooling of these separated inert fluidized bed solids resulting from the operation of the initial multiple solid fluidized bed reactor. This external boiler is essentially an external heat exchanger having immersed tubes in which high pressure steam is generated by the heated solids. This unit operates at essentially a temperature of about 850° to 1100° F. After imparting much of their heat to the production of steam, the inert solids are returned to the initial fluidized bed reactor for recycling along with further concentrated spent pulping liquor.

The gaseous material which is further produced in the gasifier, which is mainly hydrogen and carbon monoxide, is introduced, along with air, into a reducer unit. This reducer unit is essentially a molten salt reactor which operates at a temperature of about 1600° to about 1800° F., in which the oxidized inorganic salts produced by the combustion of the spent liquors, uncombusted carbonaceous materials and any uncombusted organics forming a portion of the flue gas stream are fed, along with reducing gas from the gasifier. The salt employed in the molten bath is produced in the combustion of the spent liquor. Reduction occurs in the molten pool at the bottom of the reactor. The air is injected into the reducer in order to combust hydrogen and reduced forms of carbon, such as carbon monoxide, before they exit the reducer reactor, and the uncombusted carbonaceous material resulting from incomplete combustion of the organic matter of the spent liquor. In accordance with one embodiment, the reducer is essentially a furnace or reactor provided with a means of agitation of the contents. The exothermic reactions taking place due to combustion of reducing gases and carbonaceous material in this unit provide heat needed to maintain the reducer temperature at elevated levels since reduction reactions are essentially endothermic. As appears from the appended drawing, the reducer, of course, separates the inorganic reaction products from the gaseous components. Salts emanating from the reducer, in the case of kraft or sulfite spent liquors, are essentially sodium sulfide and sodium carbonate, along with minor amounts of sodium sulfate. Optionally, after cooling and solidification, they are then blended with water to produce green liquor in a reaction vessel.

By the addition of lime to the green liquor, the sodium carbonate present is converted substantially to sodium hydroxide and after filtration to remove the insoluble calcium carbonate which forms, the resulting product is the conventional white liquor, suitable for reuse in the kraft pulping process after reconstitution by any amounts of cooking components which have been removed in the recovery process of the invention.

The flue gases from the process are passed through an economizer or standard heat exchanger which removes residual heat from the gases before they are emitted into the atmosphere.

In its essential parts, the apparatus of the invention comprises an initial fluidized bed reactor having means for providing intake of the concentrated spent pulping liquor and high velocity air near the bottom and removal of combustion products, both gaseous and solid, from the top, a means for providing an initial separation of inert solids from other solids and gaseous reaction components, optional means for treatment of the removed solids in a reaction unit which is essentially a fluidized bed reactor, communicating with an external heat exchanger which, in turn, communicates with the initial fluidized bed reactor, a reduce for converting oxidized inorganic salts to inorganic sulfides, and a final heat exchanger for recovery of additional heat values contained in the flue gases.

SPECIFIC EMBODIMENTS OF THE INVENTION

The practice of the invention will be described by reference to the appended drawing as applied to the recovery of kraft black liquor. It should be recognized that the invention is applicable to the recovery of other spent pulping liquors, such as spent sulfite or soda pulping liquors.

EXAMPLE 1

Kraft black liquor, as it is removed as an effluent in the pulping of wood in a paper-making plant, is normally of relatively low solids concentration, containing in the order of 14 percent by weight of solids. In the practice of the process of the invention, this liquor is desirably concentrated to a total solids content of at least about 50 percent and desirably between about 50 and 100 percent by weight of solids, preferably about 60 to 85 percent by weight. This can be effectively accomplished by treating the kraft black liquor as it leaves the pulping operation in multiple-effect evaporators (1) to remove a large proportion of the water and increase the total solids content.

The effluent from the multiple-effect evaporators (1) has a total solids content of about 65 percent by weight and has had its temperature elevated to about 150°–200° F., desirably about 180° F., where it is passed through conduit (2) into initial fluidized bed reactor (3), near the lower end of the reactor. In accordance with one embodiment of the invention, the fluidized bed reactor is a multiple solids fluidized bed reactor of the type disclosed in Nack et al. U.S. Pat. No. 4,084,545, granted Apr. 18, 1978. See FIG. 2 of the drawings of that patent and the relevant specification.

The multiple solids fluidized bed reactor (3) is operated with a plurality of solids present. As the finer and entrainable solid is Speculite of particles of $-16 +140$ U.S. mesh size and as the coarse, non-entrainable particles are an equal amount by weight of sand or Speculite of about $-12 +16$ U.S. mesh size.

Into the fluidized bed reactor (3) there is also introduced air at ambient or elevated temperature through the bottom of the reactor as shown at (4), along with the concentrated black liquor which also enters the reactor near the bottom as shown at (2). The amounts of air and concentrated black liquor entering the fluidized bed reactor (3) are adjusted to provide combustion of about 80 to 90 percent, based on carbon content, of the black liquor. The organic solids, which are combusted, produce carbon dioxide and nitrogen gases, water, and the inorganic or mineral content of the black liquor is converted into sulfate and carbonate. Carbonaceous materials, including carbon, are produced due to the incomplete combustion of the organic content of the black liquor. Desirably, sufficient combustion takes place to generate a temperature within the fluidized bed reactor (3) of between about 1100° and 1400° F., preferably about 1300° F.

The superficial velocity of air introduction is adjusted to about 30 feet per second so as to permit entrainment of most of the solids produced by combustion in the reactor (3) along with much of the entrained fine particle solid, Speculite. These solids escape out the top (5) of the fluidized bed reactor (3). The combined entrained solids are transferred through conduit (6) into cyclone separator (7) which separates most of the inert solid content (Speculite) from the mixture of spent liquor solids and gases. The gaseous materials, principally, carbon dioxide, nitrogen, and moisture, are removed from the top of the cyclone separator (7) through conduit (8), along with a major portion of the combustion product inorganic solids, sulfates and carbonates, along with uncombusted carbonaceous materials. The major portion of the inert solids, consisting of the fine particle Speculite and minor amounts of inorganic sulfate, carbonate salts and uncombusted carbonaceous materials is removed from the cyclone separator (7) at the bottom through conduit (9). The solids transferred from the cyclone separator (7) through conduit (9) are desirably at a temperature of between about 1100° and 1400° F., preferably about 1300° F. They are passed into gasifier (10), into which a small proportion of additional concentrated black liquor is introduced at (11).

The gasifier (10), which is optional, is operated without the addition of any oxygen whereby the black liquor provides a reducing gas composition under the relatively high temperature non-oxygen atmosphere and in the presence of the solids. This gaseous reducing composition is removed through line (12), where the gases now have a temperature of about 1050° to 1350° F., preferably about 1250° F. The contents of line (12) are reducing gases consisting mainly of carbon monoxide and hydrogen, along with hydrogen sulfide, methane, as well as residual carbon dioxide, nitrogen, and water.

The inert solid component (Speculite) is passed from gasifier (10) through line (13) into heat exchanger (14), whereby a portion of the heat of the remaining solids is exchanged into a heat coil (15) containing water, which produces steam. The heat exchanger (14) is a conventional unit employed in combination with a conventional fluidized bed reactor, whereby the heat coil (15) provides the role of a heat removal component. These solids, having surrendered a good proportion of their heat, are removed from the heat exchanger (14) through conduit (16) into the bottom of multiple solid fluidized bed reactor (3) to be recycled therethrough.

The gaseous component removed from the cylone separator (7) through conduit (8) containing the combustion gases from reactor (3) and some remaining sulfate and carbonate solids and uncombusted carbonaceous material, are passed through a second cyclone separator (17), where additional separation is made of retained solids, namely, the uncombusted organics and inorganic salts of sulfate and carbonate ions, such as sodium and calcium sulfate and carbonate, which are removed through the bottom of cyclone separator (17) through conduit (18) into reducer (19). The gaseous components are removed from cyclone separator (17) through conduit (20). In the normal operation of the process, the gaseous effluent passing through conduit (20) contains substantially no reducing gases and is composed mostly of carbon dioxide, nitrogen, moisture, and traces of sulfur dioxide. These gases, having been almost completely separated from the solids and passed through conduit (20), are transmitted into heat exchanger (21), which is a standard heat exchanger capable of removing heat from the gases before being passed into the atmosphere through conduit (22), by which time the temperature of the flue gases has been substantially reduced to a desirable temperature compatible with the environment, such as 400° F. At this stage, the gases released into the atmosphere contain no pollutants, except perhaps mere traces of sulfur dioxide which can be removed by conventional means.

The solids, including the uncombusted carbonaceous material, is introduced through conduit (18) into reducer (19) and mingled with air introduced through inlet (23). The reducer (19) is a standard furnace or reactor. The purpose of the introduction of air into the reducer (19) is to combust the uncombusted carbonaceous material and any unreacted reducing gases, such as carbon monoxide and hydrogen, and other gases, methane and hydrogen sulfide, before being released through conduit (24) to join the other flue gases in conduit (20). The reducer (19) is desirably operated at a temperature of about 1650° F. The reducer contains a molten mixture of about two to three parts by weight of sodium carbonate and about one part by weight of sodium sulfate, in which a substantial amount of the chemical reduction takes place, and which is provided with a means of agitation.

The purpose of reducer (19) is to reduce much of the inorganic sulfate solids to sulfides, which are necessary components of the kraft pulping solutions.

The uncombusted carbonaceous material performs a dual role in the reducer. It acts as a potent chemical reducing agent to reduce sulfate and any thiosulfate to sulfide salts and to supply heat of combustion due to the combustion of the carbonaceous material by the air introduced in inlet (23). The reduction of sulfate to sulfide is an endothermic reaction and heat to support this reaction is conveniently supplied by the combustion of the carbonaceous material along with the carbon monoxide present.

The solids are removed from reducer (19) through conduit (27) in which stage the solids are in the form of inorganic sulfides, carbonates, and some minor amounts of unreduced sulfates of sodium and calcium, where they are then introduced into vat (28) and quenched by the water which is added through pipe (29) to form green liquor. The green liquor is removed through conduit (30) to be converted to white liquor in accordance with conventional means, which white liquor is returned to the pulping process.

Part of the flue gas is removed from conduit (20) through conduit (31) compressed in compressor (32) and recycled into the bottom of heat exchanger (14) through conduit (33). Most of the content of this flue gas is carbon dioxide and nitrogen, which are relatively inert to the solids. The purpose of this recycle is to return some of the unexpended heat back into the system and to provide a temperature within the heat exchanger (14) to about 900° F., as well as to provide fluidizing gas for the external boiler (14) and the gasifier (10). Some of the gaseous material is further transmitted through conduit (34) into gasifier (10) to provide gas flow for fluidization purposes.

Thus, by operation of the process, black liquor has had much of its organic matter combusted in fluidized bed reactor (3) to burn much of the organics present and thereafter, in a sequence of steps, the heat values are recaptured and returned to the pulping plant. The mineral components are recovered to form a conventional green liquor used in the pulping operation, and toxic and obnoxious gases are recovered in a useable form. The only material going into the atmosphere is the inert gases which are compatible with the atmosphere and provide no substantial pollution.

Central to the present invention is the employment of the multiple solid fluidized bed reactor (3) with its involvement of a plurality of fluidizing particulate matters which serve the important role of absorbing heat of combustion. A portion of these solids is drawn off at the top of the reactor to have their sensible heat recovered at a later stage in the heat exchanger (14). This eliminates the need for any initial heat removal surfaces within the reactor (3), even through the combustion is carried out very efficiently at high gas velocities. The presence of the fluidizing solids in reactor (3) prevents possible fusing of the salts formed in the combustion of the waste pulping liquor.

The process provides an effective means of solids separation and recovery. Exiting at the top of reactor (3) are flue gas, a portion of the inert bed solids, and oxidized salts to be recovered and reused in the pulping operation, along with some still uncombusted organic material. The inert bed solids, such as Speculite, which are entrained in reactor (3) are recovered and recycled to the reactor. The flue gas, salts and uncombusted organics are effectively separated by cyclones, with the process solids flowing to reducer (19).

The external boiler (14) serves the important role of recovering heat of combustion as stored in the sensible heat from the separated bed solids. Steam generated in heat exchanger (14) provides heat for plant boilers and removal of much of the heat from the bed solids before they are returned to reactor (3).

Gasifier (10) provides a generator of reducing gases to chemically reduce some of the inorganic salt products formed in the combustion. An important phase of the chemical reduction is the conversion of sodium sulfate to sodium sulfide which is an important ingredient in the kraft pulping process. This reduction takes place in reducer (19), as described. Reduction takes place in the molten salt portion in the lower portion of reducer (19). Air is introduced into the reducer (19) to combust residual hydrogen and reduced forms of carbon such as carbon monoxide before they exit the reducer. The air, of course, also performs the important role of combusting the uncombusted carbonaceous material to provide heat. These reactions are exothermic which provide the high temperature necessary for the operation of the reducer and support the reduction reactions which are endothermic.

A feature of the present invention which is believed to impart substantial benefits thereto is the treatment of the concentrated spent pulping liquor in a sequence of a multiple solid fluidized bed reactor in conjunction with at least an additional fluidized bed treatment thereafter, and particularly for use in the recovery of waste liquors for reuse in the pulping process, a final reducing unit, preferably employing a molten salt bath. These stages cooperate to provide the desirable results of the present invention.

EXAMPLE 2

The foregoing example was repeated in which kraft black liquor, after being concentrated by multiple effect evaporators (1) to a total solids content of about 67.5 percent, was injected into initial fluidized bed reactor (3), near its lower end (2), at feed rates varying between 110 and 130 pounds per hour. The fluidized bed reactor (3) was provided with −16 U.S. mesh size Speculite as a finer entrainable solid and ground iron ore of about −12 +16 U.S. mesh size as the non-entrainable solid. The combustor temperature in fluidized bed reactor (3) was maintained at a temperature of between 1280° and 1360° F., with an air flow injection into the bottom (4) of reactor (3) at a rate of about 82 scfm. In a run conducted over a period of about 10 hours, about 715 pounds of kraft black liquor had been fed into the reactor (3). The percent carbon utilization in the run was found to range from about 69 to 90 percent. The conduct of the run was otherwise that described in Example 1.

EXAMPLE 3

Example 1 was repeated in which kraft black liquor, after being concentrated by multiple effect evaporators (1) to a total solids content of about 67.5 percent, was injected into initial fluidized bed reactor (3), near its lower end (2) at an average feed rate of about 105 pounds per hour. The fluidized bed reactor (3) was provided with −16 U.S. mesh size Speculite as a finer entrainable solid and ground iron ore of about −12 +16 U.S. mesh size as the non-entrainable solid. The combustor temperature in fluidized bed reactor (3) was maintained at a temperature of between 1270° and 1300° F., with an air flow injection into the bottom (4) of reactor (3) at a rate of about 83 scfm. In a run conducted over a period of about 1 hour, 25 minutes, about 140 pounds of kraft black liquor had been fed into the reactor (3). The percent carbon utilization in the run was found to range from about 70 to 90 percent. The conduct of the run was otherwise that described in Example 1.

As will be appreciated by those skilled in the art, based on the teachings of the foregoing disclosure, when spent pulping liquors other than kraft black liquor are employed, the details of the foregoing examples may be modified somewhat in view of the chemical content of the various spent liquors. Thus, when employing the process of the present invention for the recovery of values from spent soda pulping liquor, the material emanating from conduit (9) will pass directly into external heat exchanger (14) and thereby omit gasifier (10) and reducer (19). A portion of the flue gas emanating from cyclone (17) is recycled to the external heat exchanger (14) to serve as a fluidizing gas. In the treatment of spent soda liquor, it would be desirable to operate the fluidized bed reactor (3) under conditions which provide complete combustion of the organic matter in the spent soda liquor.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. An integrated process for the recovery of the energy and chemical values from spent pulping liquors, comprising an initial stage of subjecting concentrated spent pulping liquor to combustion with air in a fluidized bed reaction chamber provided with a plurality of solid particulate materials, at least one of which is of finer particle size than another, followed by separation of the finer particle size particulate material from the gaseous and solid combustion products outside of said initial fluidized bed reaction chamber, followed by at least one further step of treating the separated finer particle size particulate material in an external fluidized bed unit to remove heat values from the separated finer particle size particulate material and followed by return of the separated finer particle size particulate material to said initial fluidized bed reaction chamber.

2. An integrated process for the recovery of the energy and chemical values from spent pulping liquors, comprising an initial stage of subjecting concentrated spent pulping liquor to combustion with air in a fluidized bed reaction chamber provided with a plurality of solid particulate materials, at least one of which is of finer particle size than another, followed by separation of the finer particle size particulate material from the gaseous and solid combustion products outside of said initial fluidized bed reaction chamber, and followed by regeneration of the pulping chemicals of the spent pulping liquor from the solid combustion products and return of the separated finer particle size particulate material to said initial fluidized bed reaction chamber.

3. An integrated process according to claim 1 or 2, wherein air and concentrated spent pulping liquor are introduced in the lower portion of said initial fluidized bed reaction chamber and combustion products and the finer particle size particulate material are removed from the upper portion of said initial fluidized bed reaction chamber.

4. An integrated process according to claim 3, wherein a portion of said finer particle size particulate material, after being separated from the gaseous and solid combustion products, are subjected to heat exchange before being returned to said initial fluidized bed reaction chamber.

5. An integrated process according to claim 3, wherein the plurality of solid particulate materials are inert.

6. An integrated process according to claim 1 or 2, wherein at least a portion of the solid combustion products separated from gaseous reaction products are subjected to a chemical reduction.

7. An integrated process according to claim 6, wherein said reduction comprises subjecting said solid combustion products to the action of a reducing gas in a chamber provided with a molten inorganic salt reaction mass.

8. An integrated process according to claim 6, wherein said reduction comprises subjecting said solid combustion products to the action of a reducing agent in the form of solid carbonaceous matter in a chamber provided with a molten inorganic salt reaction mass.

9. An integrated process according to claim 6, wherein the reduced inorganic solid combustion products are treated with water and reused in wood pulping operations.

10. An integrated process according to claim 1 or 2, wherein the organic matter of said spent pulping liquor is incompletely combusted in said initial fluidized bed reaction chamber.

11. An integrated process according to claim 1 or 2, wherein about 80 to 90%, based on carbon content of said spent pulping liquor, is combusted in said initial fluidized bed reaction chamber.

12. An integrated process according to claim 10, wherein the uncombusted carbonaceous material produced in said initial fluidized bed reactor is employed to subsequently chemically reduce oxidized inorganic salts produced by the combustion of said spent pulping liquor in said initial fluidized bed reaction chamber.

13. An integrated process according to claim 1 or 2, wherein the spent pulping liquor is kraft black liquor.

14. An integrated process for the recovery of the energy and chemical values from spent pulping liquors, comprising an initial stage of subjecting concentrated spent pulping liquor to combustion with air in a fluidized bed reaction chamber provided with a plurality of solid particulate materials, at least one of which is of finer particle size than another, said air being introduced at sufficient velocity to provide removal of the combustion products and the finer particle size particulate material from the upper portion of said initial fluidized bed reaction chamber, separating at least some of the entrained finer particle size particulate material from the gaseous and solid combustion products, returning at least some of the finer particle size particulate material to said initial fluidized bed reaction chamber, and subjecting a portion of the inorganic solid combustion products to chemical reduction, after which the chemically reduced inorganic solid products are dissolved in water.

15. An integrated process according to claim 14, wherein the organic matter of said spent pulping liquor is incompletely combusted in said initial fluidized bed reactor and the resulting uncombusted carbonaceous material is employed to provide said chemical reduction of the said inorganic solid combustion products.

16. An integrated process according to claim 15, wherein about 80 to 90%, based on carbon content of said spent pulping liquor is combusted in said initial fluidized bed reactor.

17. A process according to claim 14, wherein the said chemical reduction is provided in part by the action of a reducing gas in a chamber provided with a molten inorganic salt mass.

18. A process according to claim 14, wherein the said chemical reaction is provided in part by the action of a reducing agent in the form of incompletely combusted organic material.

19. A process according to claim 17, wherein the chemically reduced inorganic solids are first cooled and solidified prior to being dissolved in water.

20. An integrated process according to claim 14, wherein said solid finer particle size solid particulate material, prior to return to said initial fluidized bed unit, is treated in a separate fluidized bed unit in the substantial absence of air and to an external heat exchange operation.

21. An integrated process for the recovery of the energy and chemical values from spent pulping liquors, comprising the steps of:
(a) subjecting concentrated spent pulping liquor to combustion with air in a fluidized bed reaction chamber provided with a plurality of inert solid particulate materials substantially inert to the reactions occurring in said combustion, said inert solid particulate materials containing at least one fraction of finer particle size than the other, said air being introduced at sufficient velocity to provide removal of the combustion products and the finer particle size fraction of the inert solid particulate materials from the upper portion of said fluidized bed reaction chamber,
(b) substantially separating the gaseous and solid combustion products from the finer particle size fraction of the inert solid particulate materials,
(c) returning the thus separated inert solid particulate material to the initial fluidized bed reaction chamber after first subjecting these solids to a further treatment in a second fluidized bed unit in an external heat exchange operation,
(d) subjecting the gaseous and solid combustion products of (b) above to a further separation of the gaseous and solid components,
(e) subjecting the solid component of the separated combustion products of (d) above to a chemical reduction,
(f) passing the gaseous component of the combustion products in (d) above and the gaseous component of the reduction step in (e) above through an external heat exchange operation so as to recover the heating value of these components,
(g) dissolving the chemically reduced inorganic solid products of step (e) in water.

22. An integrated process according to claim 21, wherein in step (a) the spent pulping liquor is combusted to about 80 to 90% of its carbon content.

23. An integrated process according to claim 22, wherein the uncombusted carbonaceous material formed in step (a) is employed in step (e) to assist in said chemical reduction and to provide additional heat energy.

24. An integrated system for the recovery of the energy and chemical values from spent pulping liquors, comprising in sequence and combination: an initial fluidized bed reaction chamber provided with means for combusting concentrated spent pulping liquor with air and a plurality of solid particulate materials, at least one of which is of finer particle size than another; means for separating the finer particle size particulate material from the gaseous and solid combustion products outside of said initial fluidized bed reaction chamber; means for returning the separated finer particle size particulate material to said initial fluidized bed reaction chamber; and chemical means for reducing at least a portion of the solid combustion products of said initial fluidized bed reaction chamber by action of a reducing gas in a molten inorganic salt mass which comprises the solid combustion products of said initial fluidized bed reaction chamber.

25. An integrated system according to claim 24, wherein the plurality of solid particulate materials are inert.

26. An integrated system according to claim 24, wherein the means for returning the separated finer particle size particulate material to said initial fluidized bed reaction chamber comprises heat-exchange means.

27. An integrated system according to claim 24, wherein there is also provided a separate fluidized bed means operating in the substantial absence of oxygen and a heat exchange means communicating with said separate fluidized bed means, and said initial fluidized bed reaction chamber.

28. An integrated system according to claim 27, wherein said separate fluidized bed means communicates with said chemical reducing means.

29. An integrated system according to claim 27, wherein said separate fluidized bed means is provided with a source of generating reducing gases.

30. An integrated system according to claim 24, wherein the initial fluidized bed reaction chamber is operated at a temperature of between about 1100° F. and 1400° F.

31. An integrated apparatus for use in the recovery of the energy and chemical values from spent pulping liquors, comprising in combination: an initial fluidized bed reaction chamber provided with means for combusting concentrated spent pulping liquor with air and a plurality of solid particulate materials, at least one of which is of finer particle size than another; means for separating the finer particle size particulate material from the gaseous and solid combustion products outside of said initial fluidized bed reaction chamber; means for returning the separated finer particle size particulate material to said initial fluidized bed reaction chamber; and chemical means for reducing at least a portion of the solid combustion products of said initial fluidized bed reaction chamber by action of a reducing gas in a molten inorganic salt mass which comprises the solid combustion products of said initial fluidized bed reaction chamber.

32. An integrated apparatus according to claim 31, wherein the plurality of solid particulate materials are inert.

33. An integrated apparatus according to claim 31, wherein the means for returning the separated finer particle size particulate material to said initial fluidized bed reaction chamber comprises heat-exchange means.

34. An integrated apparatus according to claim 31, also comprising a second fluidized bed means communicating with a heat exchanger means which in turn communicates with said initial fluidized bed reaction chamber.

35. An integrated apparatus according to claim 34, wherein said second fluidized bed means communicates with said chemical reducing means.

36. An integrated apparatus according to claim 34, wherein said second fluidized bed means is provided with a source of generating reducing gases.

37. An integrated apparatus according to claim 34, wherein the initial fluidized bed reaction chamber is operated at a temperature of between about 1100° F. and 1400° F.

38. An integrated process for the recovery of the energy and chemical values from spent pulping liquors, comprising the steps of:

(a) subjecting concentrated spent pulping liquor to combustion with air in a fluidized bed reaction chamber provided with a plurality of solid particulate materials, said solid particulate materials containing at least one fraction of finer particle size than the other, said air being introduced at sufficient velocity to provide removal of the combustion products and the finer particle size fraction of the solid particulate materials from the upper portion of said fluidized bed reaction chamber, (b) substantially separating the gaseous and solid combustion products from the finer particle size fraction of the solid particulate materials, (c) returning the thus separated solid particulate material to the initial fluidized bed reaction chamber after first subjecting these solids to a further treatment in a second fluidized bed unit in an external heat exchange operation, (d) subjecting the gaseous and solid combustion products of (b) above to a further separation of the gaseous and solid components, (e) subjecting the said solid component of the separated combustion products of (d) above to a chemical reduction, (f) passing the gaseous component of the combustion products in (d) above and the gaseous component of the reduction step in (e) above through an external heat exchange operation so as to recover the heating value of these components, and (g) dissolving the chemically reduced inorganic solid products of step (e) in water.

39. An integrated process according to claim 38, wherein in step (a) the spent pulping liquor is incompletely combusted.

40. An integrated process according to claim 39, wherein in step (a) the spent pulping liquor is combusted to about 80 to 90% of its carbon content.

41. An integrated process according to claim 40, wherein the uncombusted carbonaceous material formed in step (a) is employed in step (e) to assist in said chemical reduction and to provide additional heat energy.

42. An integrated process according to claim 1, 2, 4, 14 or 20, wherein the plurality of solid particulate materials are inert.

* * * * *

UNITED STATES PATENT AND TRADEMARK OFFICE
CERTIFICATE OF CORRECTION

PATENT NO. : 4,303,469

DATED : December 1, 1981

INVENTOR(S) : DiNovo et al.

It is certified that error appears in the above—identified patent and that said Letters Patent is hereby corrected as shown below:

Col. 1, line 17 - "o" should be -- of --;

Col. 2, line 27 - "Shal" should be -- Shah --;

Col. 9, line 39 - "reduce" should be -- reducer --;

Col. 12, line 47 - "through" should be -- though --;

Col. 18, line 38 - "said" should be deleted.

Signed and Sealed this

Eleventh Day of May 1982

[SEAL]

Attest:

GERALD J. MOSSINGHOFF

Attesting Officer

Commissioner of Patents and Trademarks